(12) United States Patent
Blackburn et al.

(10) Patent No.: US 8,473,994 B2
(45) Date of Patent: Jun. 25, 2013

(54) COMMUNICATION SYSTEM AND METHOD

(75) Inventors: Helen Blackburn, London (GB); Mark McLaughlin, Woking (GB); Marek Laasik, Tallinn (EE)

(73) Assignee: Skype, Dublin (IE)

( * ) Notice: Subject to any disclaimer, the term of this patent is extended or adjusted under 35 U.S.C. 154(b) by 417 days.

(21) Appl. No.: 12/455,084

(22) Filed: May 28, 2009

(65) Prior Publication Data

US 2010/0064333 A1 Mar. 11, 2010

(30) Foreign Application Priority Data

Sep. 5, 2008 (GB) .................................... 0816280.2

(51) Int. Cl.
*H04N 7/173* (2011.01)
(52) U.S. Cl.
USPC .......................................... 725/110; 725/133
(58) Field of Classification Search
USPC .................................................. 725/110, 133
See application file for complete search history.

(56) References Cited

U.S. PATENT DOCUMENTS

| | | | |
|---|---|---|---|
| 5,506,572 A | 4/1996 | Hills et al. | |
| 5,587,928 A | 12/1996 | Jones et al. | |
| 5,812,770 A | 9/1998 | Sakai | |
| 5,856,821 A | 1/1999 | Funahashi | |
| 5,923,737 A | 7/1999 | Weishut et al. | |
| 6,061,434 A | 5/2000 | Corbett | |
| 6,151,619 A | 11/2000 | Riddle | |
| 6,209,025 B1 | 3/2001 | Bellamy | |
| 6,243,129 B1 | 6/2001 | Deierling | |
| 6,286,140 B1 | 9/2001 | Ivanyi | |
| 6,628,964 B1 | 9/2003 | Bates et al. | |
| 6,636,269 B1 | 10/2003 | Baldwin | |
| 6,789,105 B2 * | 9/2004 | Ludwig et al. ................ | 709/204 |
| 6,930,661 B2 | 8/2005 | Uchida et al. | |
| 7,058,901 B1 | 6/2006 | Hafey et al. | |
| 7,099,693 B2 | 8/2006 | Shin | |
| 7,184,049 B2 * | 2/2007 | Ballin et al. .................. | 345/473 |
| 7,454,711 B2 | 11/2008 | Angiulo et al. | |
| 7,573,988 B2 | 8/2009 | Lee et al. | |

(Continued)

FOREIGN PATENT DOCUMENTS

| | | |
|---|---|---|
| DE | 19971016486 | 9/1998 |
| DE | 102006001607 | 8/2006 |

(Continued)

OTHER PUBLICATIONS

Notification of Transmittal of the International Search Report and the Written Opinion of the International Searching Authority, or the Declaration, dated Apr. 12, 2009, for International Application No. PCT/EP2009/061418, consisting of 13 pages.

(Continued)

*Primary Examiner* — Pankaj Kumar
*Assistant Examiner* — Charles N Hicks
(74) *Attorney, Agent, or Firm* — Wolfe-SBMC (57) ABSTRACT

A media appliance and corresponding method, the media appliance comprising a video signal source such as a TV receiver, and signal processing apparatus for generating a corresponding sequence of frames for output to a screen. The appliance comprises a client application programmed to capture one of the frames and use the captured frame to generate an image to represent a user in relation to bidirectional communications over a packet-based network.

20 Claims, 5 Drawing Sheets

U.S. PATENT DOCUMENTS

| | | |
|---|---|---|
| 7,587,684 B2 | 9/2009 | Perttula |
| 7,954,124 B2 | 5/2011 | Rambo |
| 7,966,039 B2 | 6/2011 | Sadovsky et al. |
| 7,983,722 B2 | 7/2011 | Lowles et al. |
| 8,407,749 B2 | 3/2013 | McLaughlin et al. |
| 8,413,199 B2 | 4/2013 | Laasik et al. |
| 8,421,839 B2 | 4/2013 | Kert |
| 2001/0005197 A1 | 6/2001 | Mishra et al. |
| 2002/0109770 A1 | 8/2002 | Terada |
| 2002/0144259 A1 | 10/2002 | Gutta et al. |
| 2002/0199181 A1 | 12/2002 | Allen |
| 2003/0009768 A1 | 1/2003 | Moir |
| 2003/0036683 A1 | 2/2003 | Kehr et al. |
| 2003/0052648 A1 | 3/2003 | Hara et al. |
| 2003/0061033 A1 | 3/2003 | Dishert |
| 2003/0070177 A1 | 4/2003 | Kondo et al. |
| 2003/0070182 A1 | 4/2003 | Pierre et al. |
| 2003/0097661 A1 | 5/2003 | Li et al. |
| 2003/0105812 A1 | 6/2003 | Flowers, Jr. et al. |
| 2003/0117419 A1 | 6/2003 | Hermanson |
| 2003/0142802 A1 | 7/2003 | Hong et al. |
| 2004/0003025 A1 | 1/2004 | Hao |
| 2004/0049624 A1 | 3/2004 | Salmonsen |
| 2004/0060067 A1* | 3/2004 | Yi ................................ 725/105 |
| 2004/0128700 A1 | 7/2004 | Pan |
| 2004/0135819 A1 | 7/2004 | Maa |
| 2004/0163127 A1* | 8/2004 | Karaoguz et al. ............. 725/120 |
| 2004/0176132 A1 | 9/2004 | Thrasher |
| 2004/0207723 A1 | 10/2004 | Davis et al. |
| 2004/0214541 A1 | 10/2004 | Choi |
| 2004/0258059 A1 | 12/2004 | Frank et al. |
| 2005/0071686 A1 | 3/2005 | Bagga et al. |
| 2005/0146598 A1 | 7/2005 | AbiEzzi et al. |
| 2005/0165922 A1 | 7/2005 | Hatano |
| 2005/0190700 A1 | 9/2005 | Melpignano |
| 2005/0249196 A1 | 11/2005 | Ansari et al. |
| 2005/0286711 A1 | 12/2005 | Lee et al. |
| 2005/0289480 A1 | 12/2005 | Mathews et al. |
| 2006/0040638 A1 | 2/2006 | McQuaide, Jr. |
| 2006/0080713 A1 | 4/2006 | Fujibayashi et al. |
| 2006/0095754 A1 | 5/2006 | Hyder et al. |
| 2006/0109268 A1 | 5/2006 | Napoli et al. |
| 2006/0181548 A1 | 8/2006 | Hafey et al. |
| 2006/0190443 A1 | 8/2006 | Mathews et al. |
| 2007/0039025 A1 | 2/2007 | Kraft et al. |
| 2007/0115346 A1 | 5/2007 | Kim et al. |
| 2007/0118866 A1 | 5/2007 | Chen |
| 2007/0139514 A1 | 6/2007 | Marley |
| 2007/0147367 A1 | 6/2007 | Hwang et al. |
| 2007/0156686 A1 | 7/2007 | Kim et al. |
| 2007/0214482 A1 | 9/2007 | Nguyen |
| 2007/0216759 A1 | 9/2007 | Gonen et al. |
| 2007/0275766 A1 | 11/2007 | Kim et al. |
| 2007/0279482 A1 | 12/2007 | Oswald et al. |
| 2008/0031169 A1 | 2/2008 | Shi et al. |
| 2008/0034325 A1 | 2/2008 | Ording |
| 2008/0062249 A1 | 3/2008 | Nagase et al. |
| 2008/0066131 A1 | 3/2008 | Chang et al. |
| 2008/0150892 A1 | 6/2008 | Duhig et al. |
| 2008/0152110 A1 | 6/2008 | Underwood et al. |
| 2008/0186410 A1 | 8/2008 | Hardacker et al. |
| 2009/0036159 A1 | 2/2009 | Chen |
| 2009/0167839 A1 | 7/2009 | Ottmar |
| 2009/0320073 A1 | 12/2009 | Reisman |
| 2010/0005497 A1* | 1/2010 | Maresca ....................... 725/109 |
| 2010/0058408 A1 | 3/2010 | LaFreniere et al. |
| 2010/0060477 A1 | 3/2010 | Laasik et al. |
| 2010/0060715 A1 | 3/2010 | Laasik et al. |
| 2010/0060716 A1 | 3/2010 | Kert |
| 2010/0060788 A1 | 3/2010 | Blackburn et al. |
| 2010/0064328 A1 | 3/2010 | Laasik et al. |
| 2010/0064329 A1 | 3/2010 | McLaughlin et al. |
| 2010/0064334 A1 | 3/2010 | Blackburn et al. |
| 2011/0043599 A1 | 2/2011 | Luo et al. |
| 2011/0173672 A1 | 7/2011 | Angiolillo et al. |

FOREIGN PATENT DOCUMENTS

| | | |
|---|---|---|
| EP | 0741484 A2 | 11/1996 |
| EP | 0919906 | 11/1998 |
| EP | 1331762 | 7/2003 |
| EP | 1 372 333 A2 | 12/2003 |
| EP | 1 622 378 A1 | 2/2006 |
| EP | 1761048 | 3/2007 |
| EP | 1853013 | 11/2007 |
| EP | 1860852 | 11/2007 |
| EP | 1 912 175 A1 | 4/2008 |
| EP | 1940156 | 7/2008 |
| EP | 2110796 | 10/2009 |
| EP | 2353296 | 8/2011 |
| GB | 2410868 | 8/2005 |
| GB | 2463108 | 3/2010 |
| GB | 2463110 | 3/2010 |
| GB | 2463124 | 3/2010 |
| GB | 2463108 | 8/2012 |
| JP | 2001169368 | 6/2001 |
| JP | 2004080289 | 3/2004 |
| JP | 2004312320 | 11/2004 |
| JP | 2007067979 | 3/2007 |
| JP | 2008182463 | 8/2008 |
| WO | WO-9851079 | 12/1998 |
| WO | WO-0130070 | 4/2001 |
| WO | WO-0147210 | 6/2001 |
| WO | WO-0167315 | 9/2001 |
| WO | WO-0230105 | 4/2002 |
| WO | WO-0230116 | 4/2002 |
| WO | WO-02082343 | 10/2002 |
| WO | WO-03021960 | 3/2003 |
| WO | WO-03028373 | 4/2003 |
| WO | WO 2005/009019 A2 | 1/2005 |
| WO | WO-2005025194 | 3/2005 |
| WO | WO-2007098155 | 8/2007 |
| WO | WO-2007113580 | 10/2007 |
| WO | WO-2007127788 | 11/2007 |
| WO | WO-2008030711 | 3/2008 |
| WO | WO-2009094291 | 7/2009 |
| WO | WO-2010026185 | 3/2010 |
| WO | WO-2010026187 | 3/2010 |
| WO | WO-2010026190 | 3/2010 |
| WO | WO-2010026191 | 3/2010 |

OTHER PUBLICATIONS

Search Report issued in Great Britain Application No. GB0816280.2, dated Dec. 3, 2009 (1 page).

"Advisory Action", U.S. Appl. No. 12/455,210, (Jun. 5, 2012), 2 pages.

"Advisory Action", U.S. Appl. No. 12/455,653, (Nov. 21, 2011), 3 pages.

"Advisory Action", U.S. Appl. No. 12/584,463, (May 17, 2012), 3 pages.

"Final Office Action", U.S. Appl. No. 12/455,210, (Mar. 19, 2012), 14 pages.

"Final Office Action", U.S. Appl. No. 12/455,652, (May 16, 2012), 30 pages.

"Final Office Action", U.S. Appl. No. 12/455,653, (Sep. 14, 2011), 30 pages.

"Final Office Action", U.S. Appl. No. 12/584,463, (Feb. 24, 2012), 12 pages.

"Foreign Office Action", Great Britain Application No. 0907818.9, (Mar. 14, 2012), 4 pages.

"International Search Report and Written Opinion", Application No. PCT/EP2009/061413, (Apr. 12, 2009), 13 pages.

"International Search Report and Written Opinion", Application No. PCT/EP2009/061410, (Oct. 20, 2009), 14 pages.

"International Search Report and Written Opinion", International Application No. PCT/EP2009/061409, (Oct. 20, 2009), 15 pages.

"International Search Report and Written Opinion", International Application No. PCT/EP2009/061411, (Nov. 26, 2009), 20 pages.

"International Search Report and Written Opinion", International Application No. PCT/EP2009/061416, (Oct. 21, 2009), 13 pages.

"International Search Report", Application No. PCT/EP2009/061406, (Dec. 4, 2009), 3 pages.

"International Search Report", GB Application 0907818.9, (Aug. 24, 2009), 1 page.
"Non-Final Office Action", U.S. Appl. No. 12/455,085, (Mar. 15, 2012), 6 pages.
"Non-Final Office Action", U.S. Appl. No. 12/455,210, (Sep. 29, 2011), 14 pages.
"Non-Final Office Action", U.S. Appl. No. 12/455,652, (Jan. 26, 2012), 28 pages.
"Non-Final Office Action", U.S. Appl. No. 12/455,653, (Mar. 23, 2011), 22 pages.
"Non-Final Office Action", U.S. Appl. No. 12/583,007, (Aug. 8, 2012), 6 pages.
"Non-Final Office Action", U.S. Appl. No. 12/584,463, (Oct. 13, 2011), 10 pages.
"Non-Final Office Action", U.S. Appl. No. 12/584,463, (Aug. 3, 2012), 11 pages.
"Search Report and Written Opinion", PCT Application PCT/EP2009/061398, (Oct. 20, 2009), 15 pages.
"Search Report under Section 17", Application No. GB0816276.0, (Nov. 27, 2009), 2 pages.
"Search Report under Section 17", Application No. GB0816271.1, (Nov. 24, 2009), 2 pages.
"Search Report under Section 17", Application No. GB0816275.2, (Nov. 23, 2009), 1 page.
"Search Report under Section 17", Application No. GB0816279.4, (Nov. 26, 2009), 2 pages.
"Search Report", Application No. GB0816278.6, (Dec. 2, 2009), 2 pages.
"Search Report", Application No. GB0816281.0, (Nov. 20, 2009), 2 pages.
"Written Opinion of the International Searching Authority", Application No. PCT/EP2009/061406, (Dec. 4, 2009), 5 pages.
"Advisory Action", U.S. Appl. No. 12/455,085, (Nov. 7, 2012), 3 pages.
"Advisory Action", U.S. Appl. No. 12/455,652, (Aug. 30, 2012), 3 pages.
"Corrected Notice of Allowance", U.S. Appl. No. 12/455,210, (Dec. 5, 2012), 2 pages.
"Examination Report", EP Application No. 0816280.2, (Feb. 29, 2012), 4 pages.
"Examination Report", GB Application No. 0816281.0, (Sep. 13, 2012), 2 pages.
"Final Office Action", U.S. Appl. No. 12/455,085, (Aug. 16, 2012), 7 pages.
"Foreign Office Action", Great Britain Application No. 0816279.4, (Mar. 8, 2012), 5 pages.
"Non-Final Office Action", U.S. Appl. No. 12/455,635, (Aug. 22, 2012), 20 pages.
"Non-Final Office Action", U.S. Appl. No. 12/455,653, (Oct. 23, 2012), 28 pages.
"Notice of Allowance", U.S. Appl. No. 12/455,210, (Oct. 10, 2012), 4 pages.
"Notice of Allowance", U.S. Appl. No. 12/583,007, (Nov. 29, 2012), 4 pages.
"Notice of Allowance", U.S. Appl. No. 12/584,463, (Nov. 16, 2012), 7 pages.
"Corrected Notice of Allowance", U.S. Appl. No. 12/583,007, (Feb. 14, 2013), 2 pages.
"Corrected Notice of Allowance", U.S. Appl. No. 12/583,007, (Mar. 21, 2013), 2 pages.
"Final Office Action", U.S. Appl. No. 12/455,635, (Dec. 13, 2012), 25 pages.
"Notice of Allowance", U.S. Appl. No. 12/455,653, (Mar. 6, 2013), 9 pages.
"Corrected Notice of Allowance", U.S. Appl. No. 12/455,653, (Apr. 19, 2013), 4 Pages.
"Notice of Allowance", U.S. Appl. No. 12/455,085, (Apr. 12, 2013), 5 pages.

* cited by examiner

COMMUNICATION SYSTEM AND METHOD

RELATED APPLICATION

This application claims priority under 35 U.S.C. §119 or 365 to Great Britain Application No. 0816280.2, filed Sep. 5, 2008. The entire teachings of the above application are incorporated herein by reference.

FIELD OF THE INVENTION

The present invention relates to facilitating communications over a communication network.

BACKGROUND

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging ("IM"), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A problem with packet-based communication networks is that the accessibility of packet-based communications to users is limited. In particular, such communications are most commonly accessed using a personal computer. This has the disadvantage that the user must be sufficiently technically competent to download and install the packet-based communication client software on their personal computer, which provides a barrier to the take-up of the packet-based communication service. Even when the communication client is installed and executed on a personal computer, the use of the packet-based communication system may be limited because personal computers are often not located in a place where the user is either familiar or comfortable with communicating. For example, a personal computer is often located in a study which for many users is not the most natural or comfortable environment for making phone calls.

Whilst packet-based communication systems can also be accessed via certain mobile devices, these generally do not have processing resources or display screens available to offer a full range of features, such as video calling.

It would therefore be desirable to make packet-based communications more accessible to users.

SUMMARY

One way to make packet-based communications more accessible to users would be to run a packet-based communication client on a processor embedded in a familiar household media appliance like a television set or a set-top box for plugging in to a television.

However, a problem with this would be that certain aspects of the client application may be difficult to control via a conventional television set, set-top box or such like. This could be because the television user-input controls and/or user interface are limited compared to those of the more usual platform of a personal computer, or less suited to controlling a communication client than those a personal computer. The problem could also arise because a user who is not technically minded, and only familiar with a television and not a personal computer, would typically find these aspects of the client application confusing.

One such aspect would be the selection an "avatar" for representing the user in relation to their communications over the packet-based communication system. The avatar is a digital image chosen by the user to represent him- or herself to other users of the system, or at least to other users whom the user in question has authorised as a contact. The user has a unique identifier identifying him or her within the packet-based communication system in question, and the avatar image is stored in association with that identifier. The identifier and associated avatar image are preferably stored at the appliance running the user's own client application and optionally also at a central server. The client and/or server make the avatar available to other users of the packet-based communication system via that system in association with the identifier in order to represent the user in relation to his or her communications. The avatar would typically be remotely visible to the other users in their respective client applications in a list of contacts available for communications, and/or would appear remotely to another user in their client during actual communications such as during a voice call. The avatar image could be an actual representation in the form of a photograph of the user; or a symbolic representation such as of a favorite cartoon character, animal, object, abstract image, or a scene from a favorite holiday destination; or indeed any image chosen by the user to appear to other users of the same packet-based communication system.

Using a personal computer, the user would have to use a separate application to save an image to a chosen destination, e.g. by using a web-browser to download and save an image to a chosen directory on their hard-drive. The user would then import that image into the client for use as the avatar, including by informing the client application of the location of the stored image. However, this method would not be so readily applicable to a client running on a television set or such like, since navigating a file system would be difficult using a conventional television controller and user interface, or may be difficult for a user who is only familiar with a television and not with a personal computer. Indeed, due to usability issues with a remote control, it is unlikely that TV devices would present any concept of a file system to the end user.

It would therefore be desirable to provide a more easily operable system, allowing a user of a communication client running on a television, set-top box or other media appliance to select an image to represent him or herself in relation to packet-based communications.

According to one aspect of the present invention, there is provided a television receiver system comprising: a television receiver operable to receive a broadcast television signal; signal processing apparatus, coupled to the television receiver, operable to process the received television signal to generate a corresponding series of frames for sequential output to a television screen; a memory storing a communication client application; communications processing apparatus, coupled to said memory and said signal processing apparatus, operable to execute the communication client application; and a user input device communicable with the communications processing apparatus; wherein the client application is programmed so as when executed to allow the user to establish bidirectional communications with one or more other users via a packet-based communication network, and to make available to the other users via the packet-based network an image stored in association with an identifier of said user to represent that user in relation to said communications; and wherein the client application is further programmed to capture one of said frames in response to a user input received from the user input device, to use the captured frame to generate said image, to store the image to a predetermined storage location, and to automatically retrieve the image from the predetermined storage location in order to make available said image in said representation to the other users.

In embodiments, the user input device may comprise a plurality of keys, said user input may comprise a key-press, and the client application may be programmed to: automatically capture a plurality of said frames in response to said key-press, each within a time window of predetermined length and beginning at a point determined relative to said key-press; output an indication of the plurality of frames to the screen for perusal by the user; receive a further user input from the user input device selecting one of said plurality of frames; and use she selected frame to generate said image.

The client application may be programmed such that the use of said frame to generate said image comprises automatically cropping the frame.

The client application may be programmed to output an instruction message to said screen for display together with said frames.

The signal processing means may be operable to process an alternative video signal from a source other than television broadcast to generate a corresponding series of frames for sequential output to the television screen, and to select between the television signal and the alternative video signal for processing to generate the series of frames for output to the screen; and the client application may be programmed to capture one the frames of the selected signal in response to a user input received from the user input device, and to use the captured frame to generate said image.

Said other source may be one of a video disc player, a personal video recorder, and a storage device of a camcorder.

Said television receiver, signal processing apparatus, memory, and communications processing apparatus may be housed within at least one of a TV set and a set-top box for connecting to a TV set.

The client application may be programmed to allow the user to establish said bidirectional communications via the Internet, and to make said image available via the Internet.

The client application may be programmed to allow the user to establish said bidirectional communications via a peer-to-peer connection in said communication network, and to make said image available to represent said user in relation to the peer-to-peer communications.

The bidirectional communication may comprise at least one of a video call, an audio phone call, and a text chat conversation.

According to another aspect of the present invention, there is provided a television set comprising: a television receiver operable to receive a broadcast television signal; a television screen; signal processing apparatus, coupled to the television receiver and screen, operable to process the received television signal to generate a corresponding series of frames for sequential output to a television screen; a memory storing a communication client application; communications processing apparatus, coupled to said memory and said signal processing apparatus, operable to execute the communication client application; and a user input device communicable with the communications processing apparatus; wherein the client application is programmed so as when executed to allow the user to establish bidirectional communications with one or more other users via a packet-based communication network, and to make available to the other users via the packet-based network an image stored in association with an identifier of said user to represent that user in relation to said communications; and wherein the client application is further programmed to capture one of said frames in response to a user input received from the user input device, and to use the captured frame to generate said image.

The client application may be programmed to capture one of said frames in response to said user input by storing the captured frame to a predetermined storage location, and to automatically retrieve the captured frame from the predetermined storage location to generate said image.

According to another aspect of the present invention, there is provided a set-top box for connection to a television set, the set-top box comprising: a television receiver operable to receive a broadcast television signal; signal processing apparatus, coupled to the television receiver, operable to process the received television signal to generate a corresponding series of frames for sequential output to a television screen; a memory storing a communication client application; communications processing apparatus, coupled to said memory and said signal processing apparatus, operable to execute the communication client application; and a user input device communicable with the communications processing apparatus; wherein the client application is programmed so as when executed to allow the user to establish bidirectional communications with one or more other users via a packet-based communication network, and to make available to the other users via the packet-based network an image stored in association with an identifier of said user to represent that user in relation to said communications; and wherein the client application is further programmed to capture one of said frames in response to a user input received from the user input device, and to use the captured frame to generate said image.

According to another aspect of the present invention, there is provided a media appliance comprising: a video signal source operable to supply a video signal; signal processing apparatus, coupled to the video signal source, operable to process the supplied video signal to generate a corresponding series of frames for sequential output to a screen; a memory storing a communication client application; communications processing apparatus, coupled to said memory and said signal processing apparatus, operable to execute the communication client application; and a user input device comprising a plurality of keys and communicable with the communications processing apparatus; wherein the client application is programmed so as when executed to allow the user to establish bidirectional communications with one or more other users via a packet-based communication network, and to make available to the other users via the packet-based network an image stored in association with an identifier of said user to represent that user in relation to said communications; and wherein the client application is further programmed to: automatically capture a plurality of said frames in response to a key-press from the user input device, each within a time window of predetermined length and beginning at a point determined relative to said key-press; to output an indication of the plurality of frames to the screen for perusal by the user; to receive a further user input from the user input device selecting one of said plurality of frames; and to use the selected frame to generate said image.

According to another aspect of the present invention, there is provided a method of communicating over a packet-based communication network, the method comprising: receiving a broadcast television signal; processing the received television signal to generate a corresponding series of frames for sequential output to a television screen; receiving an input from a user of the packet-based communication network; in response said user input, executing code to capture one of said frames, use the captured frame to generate an image, and store the image to a predetermined storage location in association with an identifier of the user; and executing a communication client application so as to establish bidirectional communications with one or more other users via a packet-based communication network; wherein the client application is programmed such that its execution causes it to automatically retrieve the image from the predetermined storage location in order to make said stored image available to the other users via the packet-based network to represent said user in relation to said communications.

According to another aspect of the present invention, there is provided a method of communicating over a packet-based communication network, the method comprising: receiving a broadcast television signal; processing the received television signal to generate a corresponding series of frames for sequential output to a television screen; detecting a key-press from a user of the packet-based communication network; in response said user input, executing code to: automatically capture a plurality of said frames in response to said key-press, each within a time window of predetermined length and beginning at a point determined relative to said key-press; output an indication of the plurality of frames to the screen for perusal by the user; receive a further user input selecting one of said plurality of frames; and use the selected frame to generate an image, and store the image in association with an identifier of the user; and executing a communication client application so as to establish bidirectional communications with one or more other users via a packet-based communication network, and to make said stored image available to the other users via the packet-based network to represent said user in relation to said communications.

According to another aspect of the present invention, there is provided a client application product which when executed on a processor will perform the methods described above.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

In order to overcome the above-mentioned problems with packet-based communication networks, a system has been developed to enable a user to access such networks from a television ("TV"). This is achieved either by embedding the communication client into the TV itself, or into a separate set-top box ("STB") television receiver connected to the TV. The client application is in the form of software stored in a memory and arranged for execution on a central processing unit (CPU), the memory and CPU being integrated together with a television receiver (and screen in the case of a TV set) into a single household appliance, and hence sold together as a single product, in a single casing preferably with remote control. The TV or STB product is preferably a dedicated TV receiver system, in that its default mode of operation is as a television or television receiver.

This arrangement is advantageous because the TV can be provided with all the embedded hardware and software required to access the packet-based communication system built-in. Alternatively, this can be embedded into a STB which is readily connected to an existing TV using known interfaces (such as SCART, Component or HDMI, for example). This eliminates the need for the user to download and install software on their personal computer, and provides a simpler method by which non-technical users can access the packet-based communication system in their home. In addition, the TV is typically located in a living room of a house, which enables the packet-based communication system to be accessed from the location in the house which is most familiar to many users for communicating with friends and relatives.

The embedding of a packet-based communication client in a TV also has the advantage that a large screen is present, which can be utilised for video calling. Furthermore, significant processing power can be provided in the TV, particularly as the power requirements for a large, mains electricity powered consumer electronics device are less stringent than, for example mobile devices. This enables a full range of features to be included in the embedded communication client, such as high quality voice and video encoding.

However, to make such an arrangement agreeable to users, it would be desirable to provide a more easily operable system allowing the user to choose an "avatar" image to represent him- or herself in relation to the packet-based communications. In fact, the inventors have recognised that the running of a client on a television, set-top box or such like provides a unique opportunity to obtain images that might not be so readily available via typical PC. Therefore in preferred embodiments, the client application is programmed to allow the user to take a screen capture from a live TV stream, to automatically store the captured image to a predetermined storage location, and to automatically use that image as an avatar to represent the user to other users of the packet-based communication system in relation to the packet-based communications conducted over that system. The screen capture could also be taken from a video stream from a video disc player such as a DVD player connected to the television, or from a stored TV stream recorded on a TV storage device like a hard-drive based Personal Video Recorder (PVR), video disc recorder, or stored footage from a camcorder.

Figure 1:
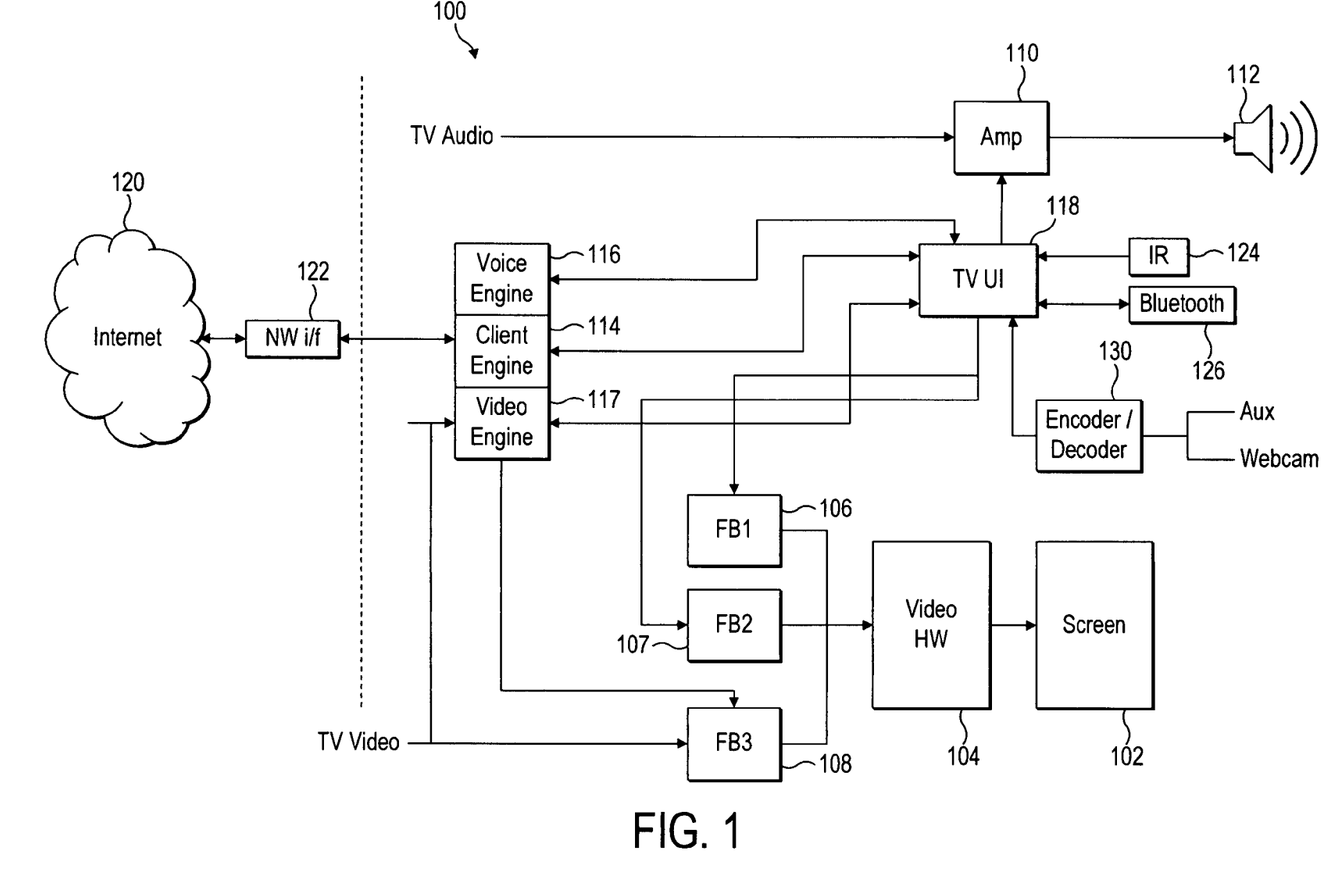
FIG. 1 is a block diagram showing the functional blocks of a TV with an embedded communication client.

Reference is now made to FIG. 1, which illustrates the hardware and software functional blocks embedded in a TV 100. The TV 100 comprises a screen 102 for displaying images to the user, which is driven by video driver hardware 104 arranged to convert the video signals into the form required to be correctly displayed on the screen 102. The video driver hardware 104 is provided with digital video data from two frame buffers 106 and 108. The frame buffers 106 and 108 are storage devices that buffer video data that is to be displayed to the user. Frame buffer 3 ("FB3") 108 receives standard TV video signals, as is known for the display of broadcast TV. Frame buffer 1 ("FB1") 106 stores video data related to the packet-based communication client, as will be described presently. An audio amplifier 110 receives TV audio signals and amplifies these for output through at least one speaker 112.

The TV audio and video input signals themselves originate from television signals broadcast via any suitable means such as a satellite repeater stations, wireless terrestrial repeater stations or cable; and are received by a television receiver unit of the TV 100 (not shown). Note that broadcasting is distinct from point-to-point communication, including being distinct from multicasting (i.e. point-to-multipoint). In broadcasting, signals are transmitted indiscriminately, i.e. regardless of whether the user has selected to receive the signal (although a decryption key or such like may still be required so that only authorised users can access the broadcast); whereas in point-to-point communication, signals must be requested by the user or users receiving them. Or put another way, to receive a broadcast a user simply "tunes in" without needing to send any signal to the broadcaster, whereas to establish a point-to-point connection then signals must be exchanged between the user and broadcaster.

The TV receiver unit may comprise for example an antenna, satellite dish or cable input; sampling circuitry; a filter; a low noise amplifier; a mixer; and/or an analogue to digital converter.

After being received by the receiver unit, the signals are then processed by a signal processing apparatus (also not shown) before being input to the frame buffers and amplifier of FIG. 1. The signal processing apparatus may comprise for example a digital filter, demultiplexer, decoder, decryption block, and/or error checking block; which may be implemented in on-chip hardware in the form of one or more on-chip peripherals, off-chip hardware in the form of one or more off-chip units accessed via one or more I/O peripherals, or in software stored in a memory and executed on a central processing unit (CPU) of the television 100, or in any combination of these.

In the case of traditional analogue television broadcasts, the signals of a plurality of different concurrent programs (of different TV channels) are frequency-division multiplexed over the airwaves by being transmitted on different frequencies. The receiving TV then requires a tuning circuit to demultiplex the broadcasts to separate out the signals of the required program. In the case of digital television broadcasts, the signals of different concurrent programs are each divided into packets and interleaved so as to time-division multiplex the different program's signals into a transport stream for broadcast. The receiving TV then requires a packet filter to demultiplex the packets and so separate out the signal of the required program.

In a preferred embodiment, the present invention is used to capture images from a TV stream, including the possibility of capturing an image from a live TV stream. The fact that the TV signal is in the form of a stream means the packets of that stream have a certain sequential order and real-time requirement relating to their information content. Although a stream may be stored for later consumption, and/or its order or timing requirements need not necessarily be maintained during processing prior to consumption, when the stream is ultimately output to the user for consumption then the order and real-time requirements must be respected (at least on a practical level to a degree that is unnoticeable or tolerable to the user). Further, the fact that the stream is "live" means it is of a currently ongoing broadcast (although not necessarily that the broadcast is being filmed live at its source).

Note: the transport packets of the TV stream are different from the packets of the packed-based communications implemented by the client, which would typically be IP packets; and the television network is separate from the packet-based communication network 120 accessed using the client. The TV network broadcasts in one downlink direction from a central source, via repeater stations, to a plurality of users; whereas the packet-based communication network 120 allows bidirectional communications to be established between end-users. Further, the TV network is hierarchical, whereas the packet-based communication network 120 is preferably non-hierarchical, especially in the case of a P2P network.

The packet-based communication client embedded in the TV 100 is based around four main elements. Preferably, these four elements are software elements that are stored in memory and executed on a CPU both embedded in the TV 100. The four elements are: a client engine 114, a voice engine 116, a video engine 117, and a TV user interface (UI) 118. An electronic program guide (EPG) may also be implemented in software, providing a schedule of television programs.

The client engine 114, voice engine 116 and video engine 117 establish and conduct bidirectional, packet-based, point-to-point (including the possibility of point-to-multipoint) communications via a packet based communication network such as the Internet; e.g. by establishing a peer-to-peer (P2P) connection over a peer-to-peer network implemented over the Internet 120.

The client engine 114 is responsible for setting up connections to the packet-based communication system. This is performed via a connection from the TV 100 to the internet 120. The TV 100 is connected to the internet 120 via a network interface 122 such as a modem, and the connection between the TV 100 and the network interface 122 may be via a wired connection or a wireless connection. The client engine 114 performs call set-up, authentication, encryption and connection management, as well as other functions relating to the packet-based communication system such as firewall traversal, presence state updating, and contact list management.

The voice engine 116 is responsible for encoding of voice signals input to the TV 100 as VoIP packet for transmission over the internet 120 and the decoding of VoIP packets received from the internet 120 for presentation as audio information to the user of the TV 100.

The video engine 117 is responsible for the encoding of video signals input to the TV (e.g. from a webcam) as packets for transmission over the internet 120 in a video call, and the decoding of video packets received from the internet 120 in a video call for presentation as video images to the user of the TV 100.

The TV 100 may comprise an encoder/decoder block 130 having an input connection for connecting to a webcam, and one or more other auxiliary inputs for connecting to another auxiliary device such as a camcorder, video disc player, personal video recorder (PVR), etc. The webcam could alternatively be built in to the same device as the TV 100 or STB. The encoder/decoder block 130 is coupled to the TV UI 118 and the client engine 114, and is configured to decode incoming video signals from the webcam or auxiliary input and also to re-encode them for output to the TV screen (or alternatively a direct trans-coder could be used).

The TV user interface ("UI") 118 is responsible for presenting visual information to the user of the TV 100 in the form of a graphical user interface displayed on the TV screen 102.

The client engine 114 is connected to the TV UI 118 in order to control what the UI displays to the user. The client engine 114 is also closely integrated with the voice engine 116 for the efficient transmission and receiving of voice packets over the internet.

The voice engine 116 is coupled to the TV UI 118 such that voice signals from the user are passed through the TV UI 118 to the voice engine 116, and vice versa. The video engine 117 is coupled to the TV UI 118 such that video signals from webcam or auxiliary inputs are passed through the TV UI 118 to the video engine and vice versa. The video engine 117 is also connected to video frame buffer FB3 (108) to output video images thereto. The video engine 117 is further coupled to receive the TV video input signal and decode the signal for capture and storage by the client engine 114.

The TV UI 118 is connected to a frame buffer 1 ("FB1") 106, so that the graphical user interface data is buffered and ultimately displayed to the user on the screen 102. The TV UI 118 is also connected to another frame buffer 2 ("FB2") 107 for providing user interface control information relating to the appearance of the UI on the screen 102, such as the degree of transparency of the user interface (i.e. how "see through" it is). The TV UI 118 is also connected to the amplifier 110, enabling sound (such as voice signals or notifications) to be produced from the TV speakers 112. The TV UI 118 is also connected to an infra-red ("IR") receiver 124 and a Bluetooth transceiver 126 which are used for communicating with a remote control unit, as will be discussed below Known TVs are not designed to accommodate any form of bi-directional communications. A system is therefore required for enabling user interaction with the TV for making and receiving calls and messages which is intuitive for users. To achieve this, the remote control of the TV is preferably enhanced to provide functionality which enables the user to make and receive calls, as well as send and receive messages using the TV.

Figure 2:
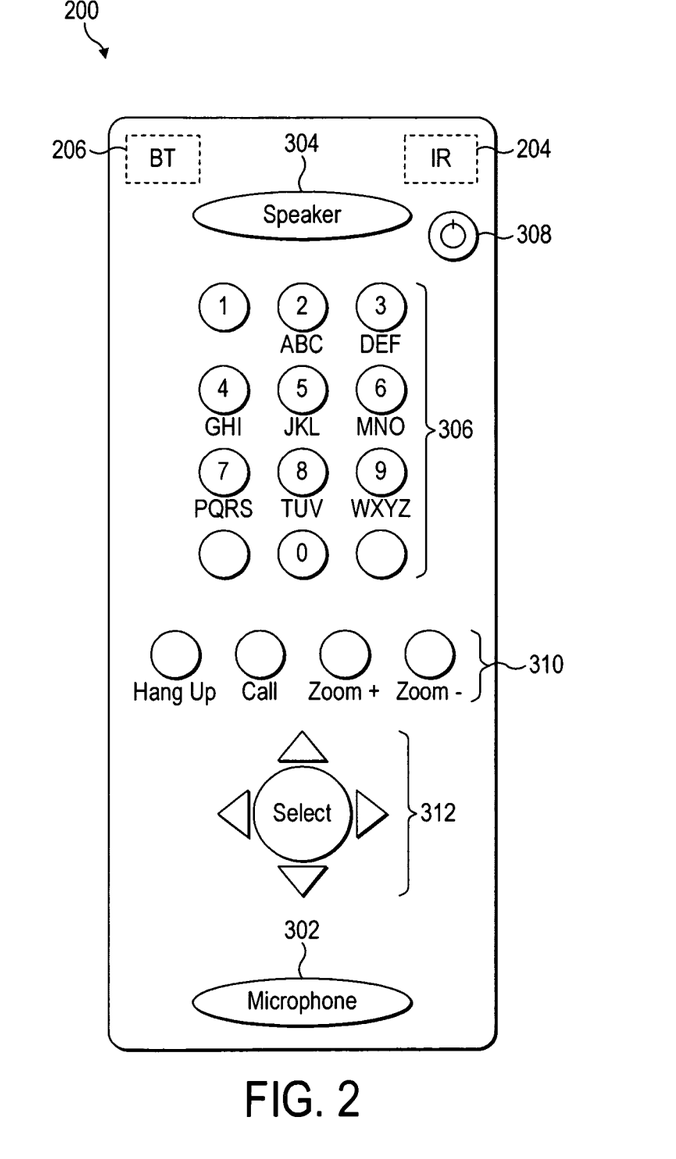
FIG. 2 shows a remote control of a remote control unit for use with the TV of FIG. 1.

Reference is now made to FIG. 2, which illustrates an example of the physical layout of a remote control unit 200 for use with the TV 100. The remote control unit 200 resembles conventional remote controls for TVs. However, the remote control unit 200 includes an integrated microphone 302, and, optionally an integrated speaker 304. This enables the remote control unit 200 to be held to the head of the user in a similar manner to a conventional telephone, or simply closer to the user to allow better pick-up of speech. Integrated within the unit are an IR transmitter 204 and Bluetooth transceiver 206. The IR transmitter 204 sends IR signals to the IR receiver 124 in the TV 100, allowing the user to change channels, turn the television on or off, or select alternative auxiliary inputs such as in input from a DVD player or other video disc system, camcorder storage or PVR. This is performed in a similar manner to conventional remote control units used with televisions. Bluetooth transceiver 206 which is able to communicate with the Bluetooth transceiver 126 located in the TV 100. The Bluetooth transceiver 206 is paired with the Bluetooth transceiver 126 located in the TV 100 such that a data connection can be readily formed between them.

The data connection enables the transmission of data from the remote control unit 200 to the TV 100, and, optionally, the reception of data from the TV 100 at the remote control unit 200. This allows audio data to be communicated with the client and voice engine 114 and 116 for use in the bidirectional, packet-based communications with other users over the Internet 120.

The remote control unit 200 further comprises a keypad 306, which is used for conventional TV control purposes, and also for entering information for the embedded packet-based communication client. The keypad 306 comprises numbered keys that can also be used to enter alphabetic characters. A standby button 308 is used for placing the TV 100 into standby mode. Dedicated function keys 310 are used to control the operation of the packet-based communication client, and a directional pad 312 is used for navigating the TV user interface. Alternatively, general purpose keys 312 such as arrow keys and a "select" button could control the packet-based communications via an on-screen menu.

Figure 3:
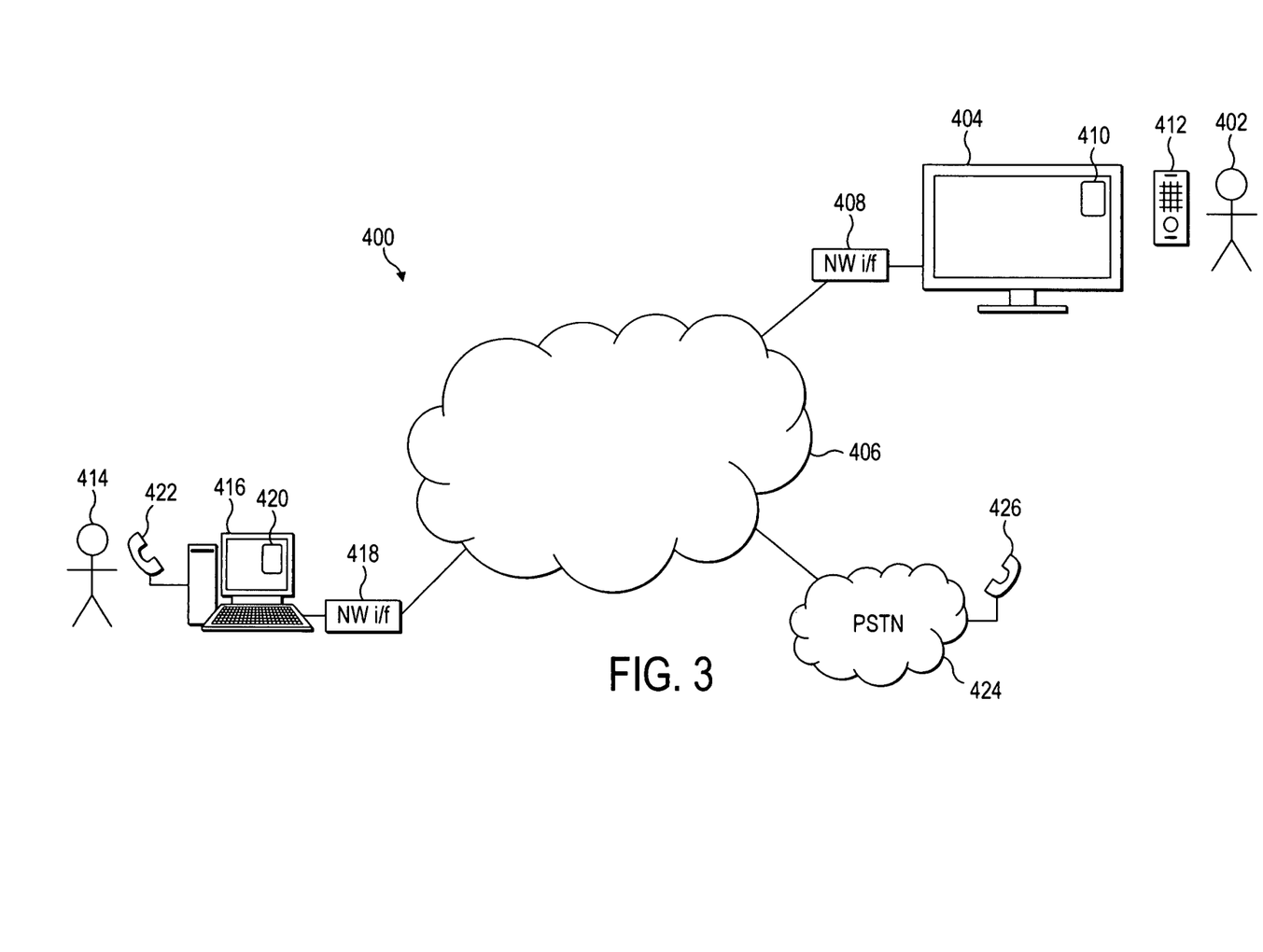
FIG. 3 shows an illustrative packet-based communication system.

In order to describe the operation of the TV 100 and enhanced remote control unit 200 with the packet based communication system, reference is now made to FIG. 3, which illustrates the use of the TV 100 in a portion of an example system 400.

Note that whilst the illustrative embodiment shown in FIG. 3 is described with reference to a P2P communication system, other types of communication system could also be used, such as non-P2P, VoIP or IM systems. The system 300 shown in FIG. 3 shows a first user 402 of the communication system operating a TV 404 (similar to the TV 100 of FIG. 1) which is shown connected to a network 406. Note that the communication system 400 utilises a network such as the Internet. The TV 404 is connected to the network 406 via a network interface 408 such as a modem, and the connection between the user terminal 104 and the network interface 108 may be via a cable (wired) connection or a wireless connection. The TV 404 shown in FIG. 3 is a standalone unit, but it should be appreciated that a separate TV and STB can also be used.

The TV 404 is executing an embedded communication client 410. Note that in alternative embodiments, the embedded communication client can be executed in a set-top box. The embedded communication client 410 comprises software stored in a memory and executed on a local processor in the TV 404.

The TV 404 is arranged to receive information from and output information to the user 402. A remote control unit 412 acts as the input device operated by the user 402 for the control of the TV 404. The remote control 412 comprises a speaker and microphone to enable the user to listen and speak in a voice call. The remote control unit 412 communicates wirelessly with the TV 404, as described previously.

The TV 404 can also receive broadcast television signals, and display these as video (television programmes) to the user on the TV screen. The broadcast television signals can be delivered by terrestrial, satellite or cable broadcasting, and be in the form of analogue signals or digital data. The user 402 can control the display of the television signals (e.g. which channels to display) using the remote control unit 412. The TV 404 can also receive one or more audio-video inputs from alternative sources such as from a DVD player or other video disc system, a PVR, or from the storage medium of a camcorder in order to playback previously recorded video. These again can be selected by the user 402 using the remote control unit 412.

The embedded communication client is arranged to establish and manage calls made over the packet-based communication system using the network 406. The embedded communication client 410 is also arranged to present information to the user 402 on the screen of the TV 404 in the form of a user interface. The user interface comprises a list of contacts associated with the user 402. Each contact in the contact list has a presence status chosen by the contact associated with it, and each of these contacts have authorised the user 402 of the client 410 to view their contact details and contact-defined presence state. The presence state tells other authorised users (e.g. 414) of the packet-based communication network 400 about the user-defined availability of the user 402.

The contact list for the users of the packet-based communication system is stored in a contact server (not shown in FIG. 3). When the client 410 first logs into the communication system the contact server is contacted, and the contact list is downloaded to the client 410. This allows the user to log into the communication system from any terminal and still access the same contact list. The contact server is also used to store a mood message (a short user-defined text-based status that is shared with all users in the contact list); and a picture selected to represent the user, which may be referred to as an "avatar". This information can be downloaded to the client 410, and allows this information to be consistent for the user when logging on from different terminals. The client 410 also periodically communicates with the contact server in order to obtain any changes to the information on the contacts in the contact list, including the avatar, or to update the stored contact list with any new contacts that have been added.

Also connected to the network 406 is a second user 414. In the illustrative example shown in FIG. 3, the user 404 is operating a user terminal 416 in the form of a personal computer. Note that in alternative embodiments, other types of user terminal can also be connected to the packet-based communication system. In addition to personal computers ("PC") (including, for example, Windows™, Mac OS™ and Linux™ PCs), a personal digital assistant ("PDA"), a mobile phone, or a gaming device could also be connected. In a preferred embodiment of the invention the user terminal 416 comprises a display such as a screen and an input device such as a keyboard, mouse, joystick and/or touch-screen. The user device 416 is connected to the network 406 via a network interface 418 such as a modem.

Note that in alternative embodiments, the user terminal 416 can connect to the communication network 406 via additional intermediate networks not shown in FIG. 1. For example, if the user terminal 416 is a mobile device, then it can connect to the communication network 406 via a mobile network (for example a GSM or UMTS network).

The user terminal 416 is running a communication client 420, provided by the software provider. The communication client 420 is a software program executed on a local processor in the user terminal 416 comprising similar elements to the embedded communication client 410. The communication client 420 enables the user terminal 416 to connect to the packet-based communication system. The user terminal 416 is also connected to a handset 422, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 416, or integrated into the user terminal 416 itself.

To be listed as a contact, a user must have been authorised. This preferably involves one user 402 sending a request to the client 420 of another user 414, and that other user 414 selecting an option to agree to the request (or vice versa), thus indicating that the requesting user is indeed recognised as a friend or associate that the other user would wish to communicate with.

Thus, presuming that the first user 402 is an authorised contact of the second user, the first user will be listed in the contact list of the client 420 presented to second user 414. This will include the avatar image of the first user 402 being made available for viewing in the client application 420 of the second user 414 (and vice versa).

The second user 414 can initiate a call to the first user 402 over the communication system by selecting the contact and clicking on a "call" button using a pointing device such as a mouse. The call set-up is performed using proprietary protocols, and the route over the network 406 between the calling user and called user is determined by the peer-to-peer system without the use of servers.

Following authentication through the presentation of digital certificates (to prove that the users are genuine subscribers of the communication system—described in more detail in WO 2005/009019), the call can be established.

Referring again to FIGS. 1 and 2, when the incoming call is received at the client engine 114 the TV UI 118 is notified of the incoming call. This places the TV UI 118 into an incoming call state, such that key presses from remote are interpreted accordingly. The TV UI 118 may output graphics to the FB1 106 to display a notification of the incoming call on the TV screen 102, such that the user 402 is aware of the incoming call. Alternatively or additionally, the TV UI 118 may generate a ringing sound or other audible signal to notify the user of the incoming call. The notification may only be active for a predetermined time, after which time the notification will fade and the incoming call state will be deactivated.

The user 402 can select to answer the incoming call by pressing a key on the remote control unit 412 or enacting a physical motion such as sliding out a movable microphone unit. In response to the user 402 selecting to answer the incoming call the remote control unit 200 transmits a command to the TV 100 using the IR transmitter 204. This command indicates that the user has selected to accept the call (either by pressing a button or performing an action). The remote control unit 200 then activates the Bluetooth transceiver 206. The Bluetooth transceiver 206 is not activated until it is needed to save battery power consumption. The Bluetooth transceiver 206 establishes a connection with the Bluetooth transceiver 126 in the TV 100. The microphone circuitry 208 is enabled to receive audio inputs.

When the TV UI 118 receives the command transmitted via the IR transmitter 204 at the IR receiver 124, this is interpreted this as a call accept command, since the TV UI 118 is in the incoming call state. Note that in alternative embodiments, the IR sent from the remote 200 command can be omitted, and the establishment of the Bluetooth connection between the TV 100 and the remote 200 can be interpreted as a call accept command instead.

The TV UI 118 outputs an "answer call" command to the client engine 114. In response to the "answer call" message, the client engine 114 establishes the call connection with the communication client 420 of the calling user 414. The avatar image of the first user 402 is preferably displayed in the client application 420 of the second user 414 (and vice versa) during the call When the user 402 talks into the microphone 302 (shown in FIG. 3), the audio signal is converted to digital data by the microphone circuitry and the Bluetooth transceiver 206 to transmit the audio signal to the Bluetooth transceiver 126 of the TV 100. The transmission of the audio can utilise a standard Bluetooth protocol for transmitting audio information.

Upon receiving the audio information at the Bluetooth transceiver 126, the TV UI 118 passes the audio information to the voice engine 116. The voice engine 116 encodes the audio information as VoIP packets and passes these to the client engine 114. The client engine 114 transmits the VoIP packets to the network 406 via the network interface 408, where they are routed to the communication client 420 running on the user terminal 416 of the second user 414. The client 420 decodes the VoIP packets to produce an audio signal that can be heard by the user 414 using the handset 422.

Conversely, when the second user 414 talks into handset 422, the client 420 executed on user terminal 416 encodes the audio signals into VoIP packets and transmits them across the network 406 to the TV 404. The VoIP packets are received at the client engine 114 and passed to the voice engine 116. The voice engine 116 decodes the VoIP packets to produce audio information. The audio information is passed to the TV UI 118.

In one embodiment, the audio information is passed from the TV UI 118 to the amplifier 110, such that the voice from the second user 414 is heard from the TV speakers 112. If the TV 100 is currently being used to watch a TV programme, then the audio from the TV programme can be deactivated. Alternatively, the audio from the call can be mixed with the TV programme audio, which can be decreased in volume. In an alternative embodiment, if the remote control unit 200 comprises the optional speaker circuitry, as described above with reference to FIG. 2, the audio information from the TV UI 118 can be passed to the Bluetooth transceiver 126 and transmitted to the remote control unit 200 and converted to audible signals by the speaker circuitry. The user can then hear the voice of the second user 414 from the speaker (304 in FIG. 2) in the remote control unit 200. Alternatively the voice of the second user can be output from the loudspeaker 112 of the first user's TV 404.

The remote control unit 200 can also be used for initiating a call to another party. For example, the first user 402 can use the remote control unit 200 to initiate a call to the second user 414. The TV UI 118 has a "call set up" state which can be entered by the user. The call set up state can be entered by the user selecting a calling functionality option using the remote, for example using a dedicated button on the remote or by navigating to an on-screen option using the directional pad (312 in FIG. 2). Alternatively, the call entry state can be entered by performing a physical action on the remote, such sliding out a movable microphone. In response to this a command is sent to the TV 100 which causes the call entry state to be entered. Typically, the call entry state displays a UI to the user comprising the contact list and a contact name/phone number entry field.

The first user 402 can select the second user 414 from the contact list and initiate the call using the remote control unit. As described above for an incoming call, this sends an IR command to the TV 100, activates the Bluetooth transceiver 206 and activates the microphone circuitry. The TV UI 118 sends a message to the client engine 114 to initiate the call to the second user 414. This is performed in a similar manner to that described above for a call initiated from the second user 414 to the first user 402. The call can then proceed in the same manner as described previously.

The VoIP packets for calls between users (such as 402 and 414) as described above are passed across the network 406 only, and the public switched telephone network ("PSTN") (424) is not involved. Furthermore, in the preferred embodiment of a P2P system, the actual voice calls between users of the communication system can be made with no central servers being used. This has the advantages that the network scales easily and maintains a high voice quality, and the call can be made cost free to the users.

However, in addition, calls can also be made from the embedded communication client 410 using the packet-based communication system to fixed-line or mobile telephones (e.g. 426), by routing the call to the PSTN network 424. Similarly, calls from fixed-line or mobile telephones 426 can be made to the packet-based communication system via the PSTN 424.

In addition to making voice calls, the user 402 of the client 410 can also communicate with the users listed in the contact list in several other ways. For example, an instant message (also known as a chat message) can be sent to a contact. As with voice calls, the remote control unit 200 can be used for instant messaging. Text data can be input using the number keys, which are also used to enter alphabetic characters. The text data is transmitted to the TV 100 using the IR transmitter 204, as this is more power-efficient than Bluetooth and does not require a high data rate.

The TV UI 118 has a "chat entry state" in which key presses from the remote control unit (received at the IR receiver 124) are interpreted as alphanumeric characters that are passed to the client engine 114. The chat entry state can be entered when a user responds to an incoming chat message, or when the user 402 selects a "chat" option displayed in the UI. The chat message data is encoded and sent from the client engine 114 over the network 406 to the communication client 420 of, for example, the second user 414. The message is displayed to the second user 414 on the user terminal 416. The second user 414 can respond by entering his own chat message, which is sent by the client 420 and received at the client engine 114. The client engine passes the message to the TV UI 118, which displays the message to the user 402 on the screen 102.

The above-described system therefore provides the ability to make and receive calls and IM message on a TV. As mentioned, it would be desirable to provide a more user-friendly method of generating the avatar image to be made available to other users in relation to such communications. Thus in a preferred embodiment of the present invention, the client application 410 is programmed to allow a user to take a snapshot of a live TV stream and to use this as their avatar. Alternatively, the user could take the image from a stored video stream or video stream received via an auxiliary input such as from a PVR, DVD player or other video disc player, of from video played back from the storage of a camcorder.

Figure 4A:
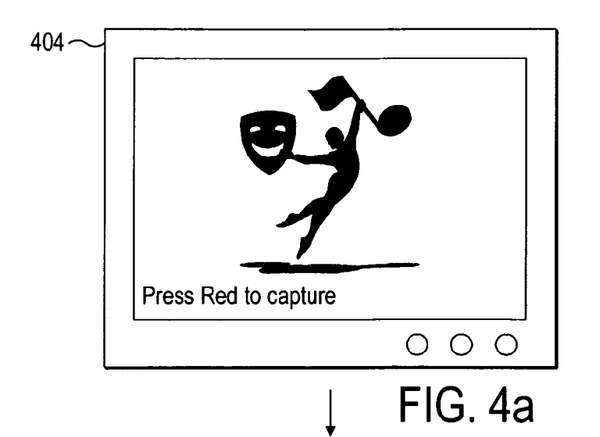
FIGS. 4(a)-4(c) show a series of schematic screen views involved in the capture of a frame for use as an avatar.

The user may select an option from the main application UI to set their avatar from live TV (or other source). As shown schematically in FIG. 4a, the client application is preferably programmed to present an overlay message, over the ongoing sequence of displayed frames generated from the live TV stream, which prompts the user to press a specified key to start capturing frames. E.g. in the example shown, the message prompts the user to press a "red" key on the remote control 200.

Figure 4B:
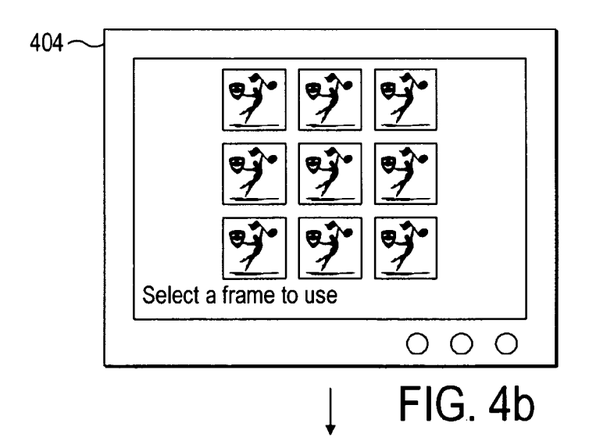

As shown schematically in FIG. 4b, the client application 410 is preferably programmed to then capture a plurality of frames of the screen in response to the user key-press. In a particularly preferred embodiment, it takes a total of nine screen captures, approximately one every 0.25 s (depending on frame-rate). The client application presents all nine to the user, preferably as a grid, with the centre frame selected by default. The user can then select the frame that they wish to use from this set.

Figure 4C:
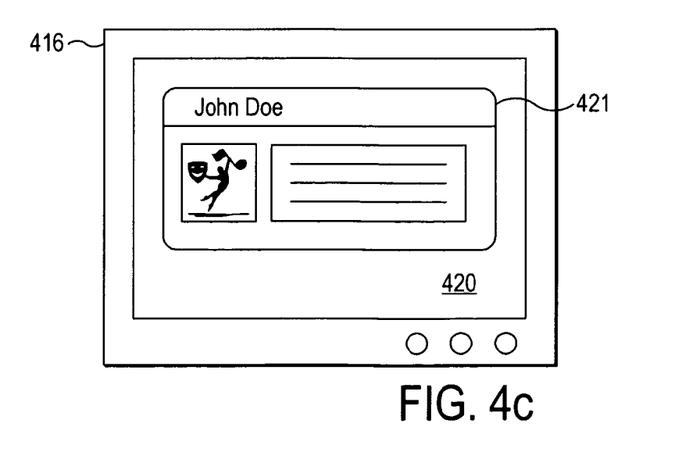

As illustrated schematically in FIG. 4c, once they have done so, the client application 410 uses the selected still frame to generate an avatar image. This may involve cropping to the centre of the image, e.g. in order to create a square image of 1:1 ratio, resizing the image, and storing the image to a predetermined storage location in a memory of the TV 410 or STB which is understood by the client application 410 as a default location for avatar images. The client application automatically sets the captured image as the current avatar for the logged in user.

The avatar image can then be displayed in the client applications 420 of other authorised users of the packet based communication network, e.g. when they view the user's profile 421, or while conducting a call or chat conversation with that user, or in the contact list in connection with that user.

Figure 5:
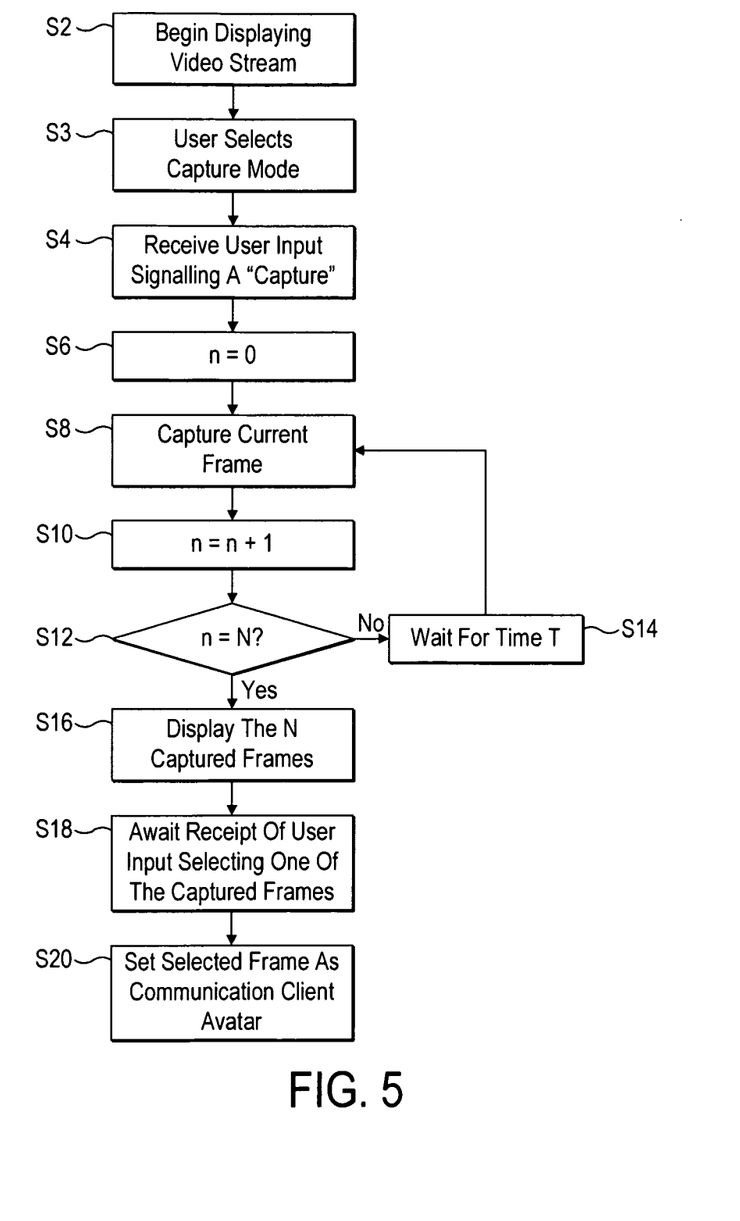
FIG. 5 is a flow diagram of steps involved in the capture of a frame for use as an avatar.

The process is now described in relation to the flow chart of FIG. 5. At step S2, the TV screen begins displaying a sequence of frames in real-time, generated from the input TV stream received by its receiver. At step S3, the user selects a "capture" option from an on-screen menu, and in response the client application 410 enters a capture mode. This may include the client application 410 outputting an overlay image to the UI frame buffer FB1 (106) for display on the screen together with the ongoing sequence of images. At step S4 the client application 410 receives a signal indicative of an appropriate user input, e.g. a particular key-press received via the remote control 200.

In response, the client application 410 begins capturing frames being displayed in a particular window of time around the time of the user input. It begins the capture process at step S6 by resetting counter value, here n=0. Then at step S8, the client application 410 captures the currently displayed frame by taking a copy of the frame as provided to the video frame buffer FB3 (108), and storing that copy to memory (although in other embodiments, the first captured frame could come from a later time in the frame buffer, or even an earlier time if the frame buffer keeps a record of previously displayed frames). At step S10 the client application 410 then increments the count value n by one. At step S12 the client application checks whether the count value n has reached a maximum value N. If not, the client application 410 waits a time T at step S14, preferably T=0.25 s (or some divisible amount of the source frame rate), and then returns to step S8 where it continues counting and capturing. Thus a plurality of frames are captured, each at slightly different times and so showing the displayed television program or video at slightly different stages in slightly different positions.

If the count value n has reached its maximum value N however, the client application stops 410 capturing frames. Once it has finished capturing, at step S16 the client application 410 outputs an indication of the N frames to the UI frame buffer FB1 (106). In a preferred embodiment N is nine so that shrunken versions of all N captured frames can be displayed together in a convenient grid arrangement on the screen (or in alternative embodiments the user could be allowed to browse through the captured frames in turn). At step S18, the client application awaits and receives a further input from the user to select the desired frame, e.g. by the user moving a cursor box over the images using arrow keys 312 on the remote control 300 then pressing select when the box is over the desired image. At step S18, the client application 410 generates the avatar image from the selected frame, preferably by cropping and resizing it, automatically stores the generated avatar image to a predetermined memory location, and automatically sets a setting indicating that image as the avatar. The client application 410 thus sets itself to automatically retrieve that image from the predetermined memory location when required, either for view by the user 402 himself in his client application 410 or for provision to other users 414 for view in their respective clients 420.

It is particularly advantageous to capture a plurality of frames over a window of time measured relative to the user key-press, because the user may not have a perfect reaction time, and so may not press the key at the ideal time to catch their preferred image. The choice of frames from a plurality different times close to the key-press allows the user to compensate for their reaction time.

Further, it is particularly advantageous to automatically store the generated avatar image to a predetermined location from whence the client application 410 is programmed to automatically retrieve the image when required. This is distinct from the case where the user has to save an image manually by navigating a file system (i.e. the directory structure), then manually import that image into the client application by again navigating the file system. Navigating a file system would be difficult using a television controller and television user interface, or would be difficult for users only familiar with conventional televisions. Indeed, there is unlikely to be any concept of a file system exposed by the television UI to the user. However, such difficulties are avoided by the automated storage of the image to a predetermined storage location.

Note: by "default location" or "predetermined location" it is not meant necessarily a specific address range, but preferably rather a predetermined location within a directory structure which is mapped to an address by the file system (and need not necessarily be mapped to a fixed address).

While this invention has been particularly shown and described with reference to preferred embodiments, it will be understood to those skilled in the art that various changes in form and detail may be made without departing from the scope of the invention as defined by the appended claims.

According to the invention in certain embodiments there is provided a television set as herein described having the following features.

The user input device may comprise a plurality of keys, said user input may comprise a key-press, and the client application may be programmed to: automatically capture a plurality of said frames in response to said key-press, each within a time window of predetermined length and beginning at a point determined relative to said key-press; to output an indication of the plurality of frames to the screen for perusal by the user; to receive a further user input from the user input device selecting one of said plurality of frames; and to use the selected frame to generate said image.

The client application may be programmed to capture one of said frames in response to said user input by storing the captured frame to a predetermined storage location, and to automatically retrieve the captured frame from the predetermined storage location to generate said image.

The client application may be programmed such that the use of said frame to generate said image comprises automatically cropping the frame.

The client application may be programmed to output an instruction message to said screen for display together with said frames.

The signal processing means may be operable to process an alternative video signal from a source other than television broadcast to generate a corresponding series of frames for sequential output to the television screen, the signal processing means may be operable to select between the television signal and the alternative video signal for processing to generate the series of frames for output to the screen; and the client application may be programmed to capture one the frames of the selected signal in response to a user input received from the user input device, and to use the captured frame to generate said image.

The other source may be one of a video disc player, a personal video recorder, and a storage device of a camcorder.

The client application may be programmed to allow the user to establish said bidirectional communications via the Internet, and to make said image available via the Internet.

The client application may be programmed to allow the user to establish said bidirectional communications via a peer-to-peer connection in said communication network, and to make said image available to represent said user in relation to the peer-to-peer communications.

The bidirectional communication may comprise at least one of a video call, an audio phone call, and a text chat conversation.

According to the invention in certain embodiments there is provided a set-top box as herein described having the following features.

The user input device may comprise a plurality of keys, said user input may comprise a key-press, and the client application may be programmed to: automatically capture a plurality of said frames in response to said key-press, each within a time window of predetermined length and beginning at a point determined relative to said key-press; to output an indication of the plurality of frames to the screen for perusal by the user; to receive a further user input from the user input device selecting one of said plurality of frames; and to use the selected frame to generate said image.

The client application may be programmed to capture one of said frames in response to said user input by storing the captured frame to a predetermined storage location, and to automatically retrieve the captured frame from the predetermined storage location to generate said image.

The client application may be programmed such that the use of said frame to generate said image comprises automatically cropping the frame.

The client application may be programmed to output an instruction message to said screen for display together with said frames.

The signal processing means may be operable to process an alternative video signal from a source other than television broadcast to generate a corresponding series of frames for sequential output to the television screen, the signal processing means may be operable to select between the television signal and the alternative video signal for processing to generate the series of frames for output to the screen; and the client application may be programmed to capture one the frames of the selected signal in response to a user input received from the user input device, and to use the captured frame to generate said image.

The other source may be one of a video disc player, a personal video recorder, and a storage device of a camcorder.

The client application may be programmed to allow the user to establish said bidirectional communications via the Internet, and to make said image available via the Internet.

The client application may be programmed to allow the user to establish said bidirectional communications via a peer-to-peer connection in said communication network, and to make said image available to represent said user in relation to the peer-to-peer communications.

The bidirectional communication may comprise at least one of a video call, an audio phone call, and a text chat conversation.

According to the invention in certain embodiments there is provided a method of communicating over a packet-based communication network as herein described having the following features.

The user input may comprise a key-press, and the execution of said code may comprise executing code to: automatically capture a plurality of said frames in response to said key-press, each within a time window of predetermined length and beginning at a point determined relative to said key-press; output an indication of the plurality of frames to the screen for perusal by the user; receive a further user input selecting one of said plurality of frames; and use the selected frame to generate said image.

The use of said frame to generate said image may comprise cropping the frame.

The method may comprise outputting an instruction message to said screen for display together with said frames.

The method may comprise: processing an alternative video signal from a source other than television broadcast to generate a corresponding series of frames for sequential output to the television screen, selecting between the television signal and the alternative video signal for processing to generate the series of frames for output to the screen; and in response to a user input, executing code to capture one the frames of the selected signal and use the captured frame to generate said image.

The processing of the alternative video signal may comprise processing a video signal from one of a video disc player, a personal video recorder, and a storage device of a camcorder.

The establishment of said bidirectional communications may comprise establishing the bidirectional communications via the Internet, and said making available may comprise making said image available via the Internet.

The establishment of said bidirectional communications may comprise establishing the bidirectional communications via a peer-to-peer connection in said communication network, and said making available may comprise making said image available to represent said user in relation to the peer-to-peer communications.

The bidirectional communication may comprise at least one of a video call, an audio phone call, and a text chat conversation.

The invention claimed is:

1. A television receiver system comprising:
a television receiver configured to receive a broadcast television signal;
a signal processing apparatus, coupled to the television receiver, configured to process the broadcast television signal to generate a corresponding series of frames of the broadcast television signal for sequential output to a television screen;
a memory storing a communication client application;
a communications processing apparatus, coupled to said memory and said signal processing apparatus, configured to execute the communication client application, the communication client application, when executed, configured to:
capture a frame of the broadcast television signal in response to an input from a user;
generate an image from the captured frame of the broadcast television signal;
automatically set the image as an avatar for the user;
enable bidirectional communications with one or more other users via a packet-based communication network; and provide the avatar to the one or more other users via the packet-based network to represent the user.

2. The system of claim 1, wherein the communication client application is further configured to generate the image by:
automatically capturing a plurality of said frames, each frame being within a time window of a predetermined length and beginning at a point determined relative to when the input is received;
outputting an indication of the plurality of frames to the television screen for perusal by the user;
receiving a further user input selecting one of said plurality of frames; and
using the selected frame to generate said image.

3. The system of claim 1, wherein the client application is configured to generate the image by automatically cropping the image from the captured frame of said broadcast television signal.

4. The system of claim 1, wherein the client application is further configured to output an instruction message to said television screen for display together with said frames.

5. The system of claim 1, wherein:
the signal processing apparatus is further configured to process an alternative video signal from a source other than television broadcast to generate a corresponding series of frames for sequential output to the television screen;
the signal processing apparatus is further configured to select between the broadcast television signal and the alternative video signal for processing to generate the series of frames for output to the television screen; and
the client application is further configured to capture one of the frames of the selected signal in response to an additional input from the user, generate an additional image from the captured frame of the selected signal, and automatically set the additional image as the avatar for the user.

6. The system of claim 5, wherein said source other than television broadcast is one of a video disc player, a personal video recorder, or a storage device of a camcorder.

7. The system of claim 1, wherein at least the television receiver, the signal processing apparatus, the memory, and the communications processing apparatus are housed within at least one of a TV set or a set-top box.

8. The system of claim 1, wherein the client application is further configured to enable said bidirectional communications via the Internet, and to provide the avatar via the Internet.

9. The system of claim 1, wherein the client application is further configured to enable said bidirectional communications via a peer-to-peer connection in said communication network, and to provide the avatar to represent said user in relation to the peer-to-peer communications.

10. The system of claim 1, wherein the bidirectional communications compriseat least one of a video call, an audio phone call, or a text chat conversation.

11. A method of communicating over a packet-based communication network, the method comprising:
receiving a broadcast television signal;
processing the broadcast television signal to generate a corresponding series of frames of the broadcast television signal for sequential output to a television screen;
receiving an input from a user of the packet-based communication network;
in response said input, capturing a frame of the broadcast television signal, generating an image from the captured frame of the broadcast television signal, and storing the image to a predetermined storage location in association with an identifier of the user; and
executing a communication client application to enable bidirectional communications with one or more other users via the packet-based communication network, wherein the communication client application configured to automatically retrieve the image from the predetermined storage location, and provide the image to the other users via the packet-based network as an avatar to represent said user in relation to said bidirectional communications.

12. A method of communicating over a packet-based communication network, the method comprising:
receiving a broadcast television signal;
processing the broadcast television signal to generate a corresponding series of frames of the broadcast television signal for sequential output to a television screen;
receiving input from a user of the packet-based communication network;
in response said input:
automatically capturing a plurality of frames of the broadcast television signal, each of the plurality of captured frames being within a time window of a predetermined length and beginning at a point determined relative to when the user input is received;
outputting an indication of the plurality of captured frames of the broadcast television signal to the television screen for perusal by the user;
receiving a further user input selecting one of said plurality of captured frames;
generating an image from the selected frame of the broadcast television signal, and storing the image in association with an identifier of the user; and
enabling bidirectional communications with one or more other users via the packet-based communication network; and
providing the image to the other users via the packet-based communication network as an avatar to represent said user in relation to said bidirectional communications.

13. A media appliance comprising:
a video signal source configured to supply a video signal;
a signal processing apparatus, coupled to the video signal source, configured to process the video signal to generate a corresponding series of frames for sequential output to a screen;
a memory storing a communication client application;
a communications processing apparatus, coupled to said memory and said signal processing apparatus, configured to execute the communication client application, the communication client application, when executed, configured to:
capture a frame of the video signal in response to an input from a user;
generate an image from the captured frame of the video signal;
automatically set the image as an avatar for the user;
enable bidirectional communications with one or more other users via a packet-based communication network; and
provide the avatar to the one or more other users via the packet-based network to represent the user.

14. The media appliance of claim 13, wherein the client application is configured to generate the image by automatically cropping the image from the captured frame of the video signal.

15. The media appliance of claim 13, wherein the video signal comprises a broadcast television signal.

16. The media appliance of claim 13, wherein the video signal source comprises one of a video disc player, a personal video recorder, or a storage device of a camcorder.

17. The method of claim 11, wherein generating the image comprises automatically cropping the image from the captured frame of the broadcast television signal.

18. The method of claim 11, wherein the communication client application is further configured to enable the bidirectional communications via a peer-to-peer connection in the communication network, and to provide the avatar to represent the user in relation to the peer-to-peer communications.

19. The method of claim 11, wherein the bidirectional communications comprise at least one of a video call, an audio phone call, or a text chat conversation.

20. The method of claim 12, wherein generating the image comprises automatically cropping the image from the selected frame of the broadcast television signal.

* * * * *